United States Patent Office 3,363,364
Patented Jan. 16, 1968

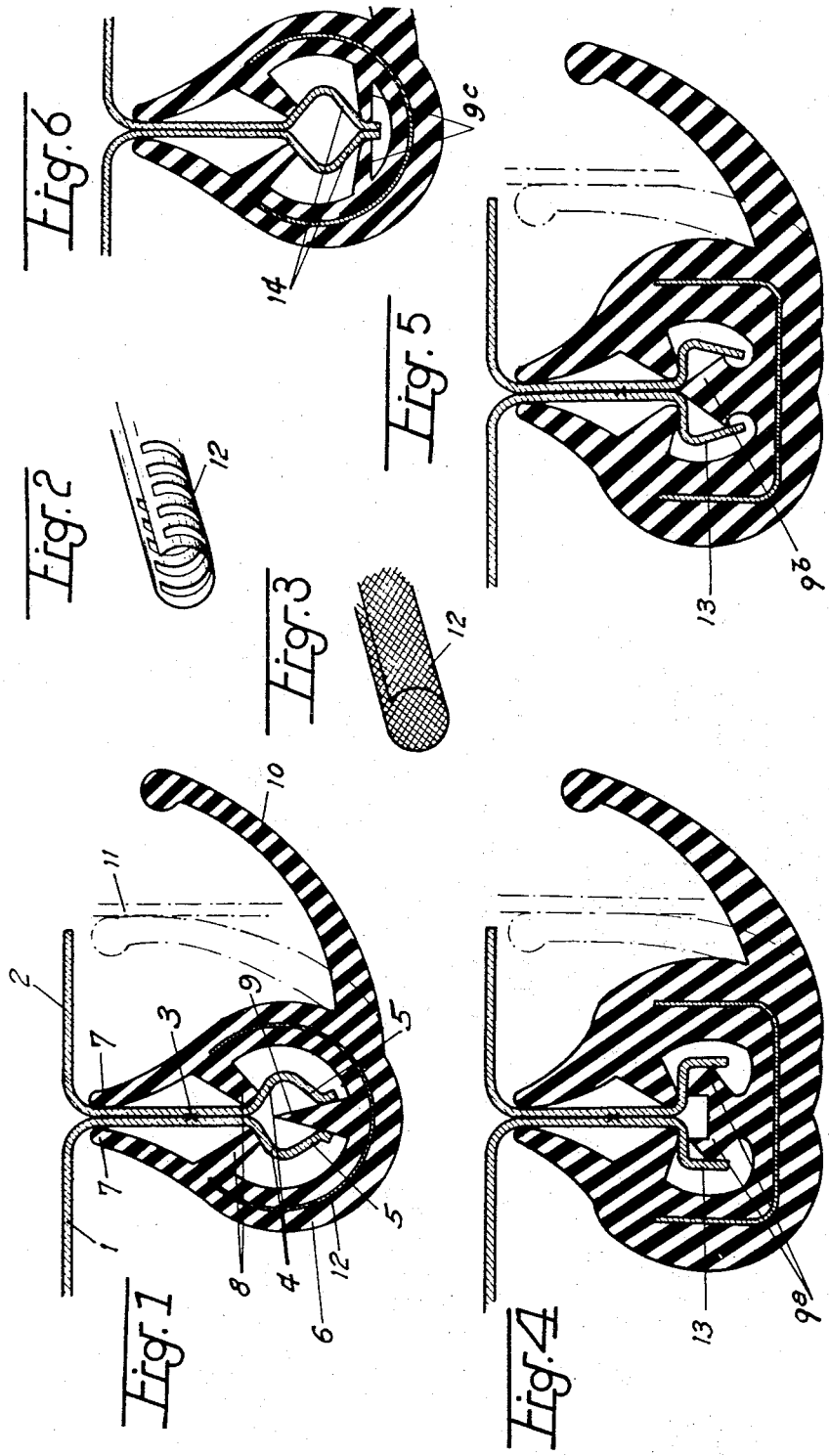

3,363,364
SEALING STRIP
Jean Cadiou, Paris, France, assignor to Société Anonyme
Andre Citroen, Paris, France, a French company
Filed June 3, 1965, Ser. No. 460,932
Claims priority, application France, June 6, 1964, 3,135
4 Claims. (Cl. 49—490)

ABSTRACT OF THE DISCLOSURE

A structural member constituted by two parts including facially abutting flanges secured to each other and having bifurcated edge portions forming a channel of greater width than the abutting flanges and which defines a continuous groove opening away from the flanges, is provided with an elastomeric sealing strip extending therealong and including a body of substantially U-shaped cross-section to embrace the channel, a centering lip within the body along the plane of symmetry thereof to engage in the groove defined by the channel, a pair of securing lips projecting internally along opposed sides of the body and converging toward the centering lip to engage behind the channel at opposite sides of the abutting flanges and sealing lips constituting extensions of the opposite sides of the body to seal against the flanges.

---

This invention relates to sealing strips.

Strips which have been used up to the present time to effect a seal, for example, between the door of a vehicle and its frame, have been secured by adhesive, or fixed by means of clips, or held by a welded reinforcement in which the sealing strip is set. But the adhesive is neither durable in time, nor durable against bad weather; furthermore, the strip to be secured by adhesive had to be formed of more or less spongy rubber which soaked up water. Fixing by clips is uncertain and mounting of the strip is difficult to carry out. Finally, the use of a welded reinforcement necessitates not only the welding of the reinforcement and the setting of the strip therein, but moreover the sealing of the reinforcement itself and retouching of the reinforcement after the setting of the strip. Moreover, in most of these mounting methods, the formation of mitered corners is unsatisfactory.

The present invention has for its object to provide a strip for effecting the sealing between two members, for example between the door of an automobile and its framework, the mounting of which is extremely simple and can be effected rapidly and which gives satisfaction in use.

There are described hereafter, by way of non-limiting example, several embodiments of the invention, with reference to the accompanying drawing, in which:

FIGURE 1 is a cross-section through a first embodiment;

FIGURES 2 and 3 show in perspective metal sections suitable for use as reinforcements for the strip;

FIGURES 4 and 5 are views similar to FIGURE 1 of two further embodiments; and

FIGURE 6 shows, in section, another embodiment.

Referring now to the drawing, and in particular to FIGURE 1, the strip is intended to be mounted for example, on the framework surrounding the door of a vehicle. This framework includes two profiled parts 1 and 2 welded to one another at 3 by their flanges. The edge portions of these flanges are bent laterally away from each other and then forwardly to define a channel of fork-shaped cross-section comprising two diverging arms 4 and two converging arms 5 which are spaced at their edges to form a continuous central groove opening forwardly along the framework.

The strip which is formed of an elastomeric material, comprises a body 6 which is part-cylindrical or of substantially U-shaped cross-section and which has lips 7 extending from its extremities. The lips 7 converge toward their free edges to abut one another, when the strip is not mounted. The body 6 is also provided with two internal support lips 8 which are disposed substantially symmetrically with respect to the median plane of the strip, and a centering lip 9 of triangular form extending rearwardly within body 6 and situated substantially on the median plane. The lips 8 extend approximately radially inward from the extremities of body 6 so as to be directed towards the front of the strip. That is, lips 8 converge toward the interior of body 6. The strip comprises, moreover, a deformable external lip 10 which projects laterally at one side of body 6 and is arranged to abut against a door 11, when in its closed position, and thereby effect the seal.

In order to mount the strip, it is sufficient to slightly draw apart the lips 7 and to press them on the profiled flanges either by hand, or with the aid of a mallet. In order to facilitate this operation, the profiled parts 1 and 2 or the inner surfaces of the sealing strip can be covered with talc or coated with a wetting agent.

The lip 9, on introduction between the arms 5 of the fork formed by the profiled parts 1 and 2, ensures automatic centering of the strips from the time it is put in place and prevents any subsequent misalignment of the strip.

When the strip is in place, its lips 8 abut against shoulders defined by the rear surfaces of the arms 4 of the fork. These lips 8 ensure the sealing from the external atmosphere of the welded joint 3 and prevent the detachment of the strip as well as its misalignment. For their part, the lips 7, by gripping the profiled parts 1 and 2, ensure that the strip is held in place and also a fluid-tight seal around the welded joint 3. Thus, the welded joint is completely covered on both sides.

In order to improve the gripping effect of the lips 7 and 8, it is possible to include in the strip, during moulding thereof, a metal reinforcement 12 of semi-cylindrical or U-shaped cross-section. In order to permit penetration of the elastomer into the reinforcement and flexing of the strip, the reinforcement 12 is preferably provided with radial apertures (FIGURE 2), or takes the form of a mesh (FIGURE 3) in which the wires are inclined with respect to the longitudinal axis of the strip.

In the modification shown in FIGURE 4, the groove defined by the fork-shaped channel 13 formed by the edges of the profiled parts 1 and 2, has a rectangular section. In this embodiment, the wedge-shaped or triangular lip 9 is replaced by two lip sections 9a each having two ridges which abut against the adjacent side and bottom, respectively, of channel 13.

In the modification shown in FIGURE 5, the fork-shaped channel 13 again has a section which is substantially rectangular but a single centering lip 9b is formed with a central, rearwardly directed ridge and with two opposed, laterally directed ridges to respectively engage the bottom and the opposite side surfaces of the groove.

In the modification shown in FIGURE 6, the edges of the profiled parts 1 and 2 are not spaced apart, but are converged into contact with each other to form a box-like enlargement 14 along the edges of the flanged parts 1 and 2, and the lip 9 is replaced by two lips 9c which abut against the contacting edges of the flanged parts. A groove can also be provided along the internal length of the strip to receive the contacting edges of flanged parts 1 and 2.

It will be seen from the preceding description that the strip according to the invention can be easily mounted and centered, that it grips the associated parts tightly, especially against accidental detachment, and that the strip ensures fluid-tightness between the frame and the door. The weld joints between parts 1 and 2 forming the framework are completely covered and it is possible to form mitered corners between lengths of the strip by joining them, for example by vulcanization, at their adjacent ends.

It is clear that the invention is not to be considered as limited to the embodiments described and shown but it covers, on the contrary, all modifications. Thus for example the profiled parts 1 and 2, may not form part of the framework of a door, but may be otherwise related. Moreover, the strip instead of being mounted on the framework of the door can be mounted on the latter.

What I claim is:

1. The combination of a structural member constituted by two parts including facially abutting flanges secured to each other and having bifurcated edge portions forming a channel of substantially greater width than said abutting flanges and which defines a continuous groove opening away from said flanges; and an elastomeric sealing strip extending along said structural member and including a body of substantially U-shaped cross-section dimensioned to embrace said channel, a centering lip extending internally along said body at the plane of symmetry thereof and being engageable in said groove, a pair of securing lips extending internally along opposed sides of said body and converging with respect to each other in the direction toward said centering lip so as to be engageable behind said channel at opposite sides of said abutting flanges, and sealing lips extending from said opposite sides of the body along the latter and converging in the direction opposed to the convergence of said securing lips to seal against said abutting flanges.

2. The combination according to claim 1, in which said channel has opposed sides thereof converging toward said opening of the groove, and said centering lip is wedge-shaped in cross-section to effect tight sealing engagement with said sides of the channel at said opening of the groove.

3. The combination according to claim 1, in which said centering lip has two opposed sections each presenting two ridges therealong respectively engaging the bottom and adjacent side of said groove.

4. The combination according to claim 1, in which said centering lip has a central ridge directed toward the converging edges of said securing lips to engage the bottom of said groove and opposed laterally directed ridges to engage the opposite sides of said groove.

References Cited

UNITED STATES PATENTS

| | | | |
|---|---|---|---|
| 2,620,524 | 12/1952 | Bright | 49—491 |
| 2,686,691 | 8/1954 | Burrell | 49—490 X |
| 2,693,011 | 11/1954 | Fernberg | 49—491 |
| 2,704,867 | 3/1955 | Dalziel et al. | 49—491 |
| 2,746,103 | 5/1956 | Bright | 49—491 |
| 2,984,875 | 5/1961 | Herr et al. | 49—491 |
| 3,016,590 | 1/1962 | Shank et al. | 52—718 X |
| 3,165,793 | 1/1965 | Lynch | 49—491 X |
| 3,222,769 | 12/1965 | Le Plae | 49—490 X |

FOREIGN PATENTS

| | | |
|---|---|---|
| 766,362 | 1/1957 | Great Britain. |

EARL J. WITMER, *Primary Examiner.*